E. B. WARREN & J. C. NIPPES.
VESSELS FOR MOLDING PITCH.

No. 195,062. Patented Sept. 11, 1877.

Witnesses
Thomas J. Bewley.
W. H. Lathrop.

Inventors
Ebenezer Burgess Warren
John C. Nippes
per Stephen Ustick, Attorney

UNITED STATES PATENT OFFICE.

EBENEZER B. WARREN AND JOHN C. NIPPES, OF PHILADELPHIA, PA.

IMPROVEMENT IN VESSELS FOR MOLDING PITCH.

Specification forming part of Letters Patent No. 195,062, dated September 11, 1877; application filed April 5, 1877.

*To all whom it may concern:*

Be it known that we, EBENEZER BURGESS WARREN and JOHN C. NIPPES, of the city and county of Philadelphia, in the State of Pennsylvania, have invented a new and useful Improvement in Vessels for Molding Pitch or other material that solidifies in cooling, which improvement is fully set forth in the following specification, reference being had to the accompanying drawings, in which—

Figure 1:
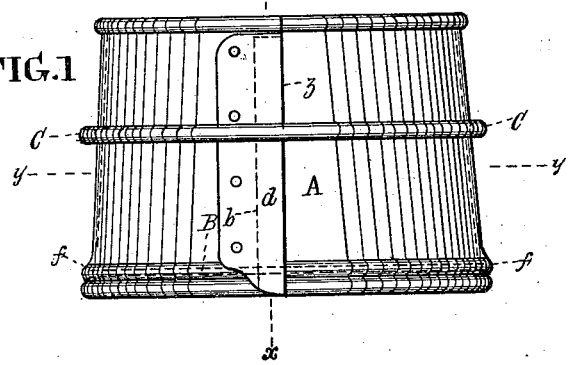
Figure 2:
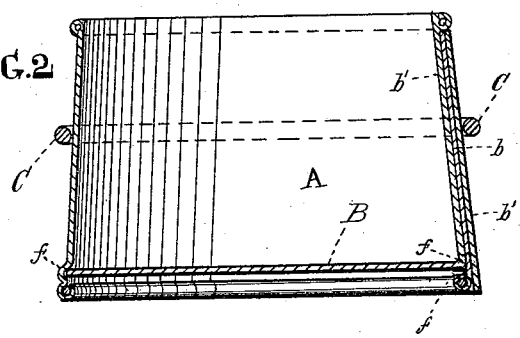
Figure 3:
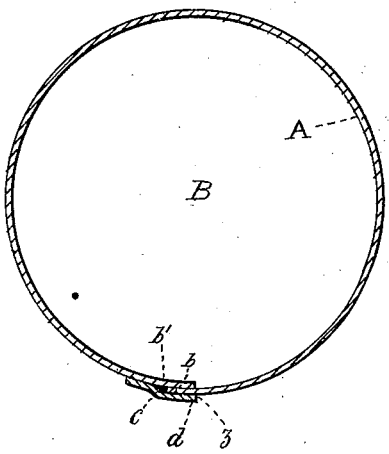

Figure 1 is a side elevation of our improved mold. Fig. 2 is a vertical section at the line $x\ x$ of Fig. 1. Fig. 3 is a horizontal section at the line $y\ y$ of Fig. 1.

Like letters of reference in all the figures indicate the same parts.

Heretofore it has been the practice to mold pitch in vessels of permanent dimensions, such as barrels, &c., and consequently there has been much difficulty in removing it from the molds.

To overcome this difficulty is the object of our invention.

The nature of the invention consists of an expanding ring, having a movable bottom, and a hoop or other suitable device for drawing its open edges together and holding them in their contracted position. The ring is made of sheet-iron or other suitable material.

A represents a ring, of circular form; yet we do not confine ourselves to this form, as any other will answer the purpose. B is a loose bottom, which is supported by the bead or annular projection $f$ of the ring A. The ring is made open at one side, and expansible, for the free delivery of the molded article when solidified, it being separated at $z$ in any manner that will admit of the edges of the sheet fitting together sufficiently tight in the contracted state of the mold. The vertical joint edge $b$ of the ring A fits in the vertical groove $c$ of the edge $b'$, which is formed by means of the strip $d$ being riveted to said edge $b'$.

C is a hoop for contracting the ring A, as seen in Fig. 1, and confining its edges $b\ b'$ together until the molded article cools. It is then removed from the ring, and the latter springs away from the molded article, so as to be readily removed therefrom.

We lute the inner surface of the ring A and bottom B, to prevent the adhesion to them of the molded material, and also the groove $f$ of the ring which incloses the bottom.

We claim as our invention—

1. The open sheet-metal ring A, for forming the continuous wall of a vessel for molding pitch or other material that solidifies in cooling, having a vertical groove, $c$, in its joint edge $b'$, in line with the sheet of metal which forms the ring, for the reception of the edge $b$, substantially as and for the purpose set forth.

2. The combination of the open cylinder or ring A, having a perpendicular groove, $c$, and a horizontal groove, $f$, confined by hoop $e$ or its equivalent, with the bottom B.

EBENEZER BURGESS WARREN.
JOHN C. NIPPES.

Witnesses:
THOMAS J. BEWLEY,
STEPHEN USTICK.